United States Patent [19]

Fujii

[11] Patent Number: 5,198,951
[45] Date of Patent: Mar. 30, 1993

[54] TAPE CASSETTE WITH MAGNETIC TAPE OUTLETS OPENABLE AND CLOSABLE BY LIDS

[75] Inventor: Hiroshi Fujii, Tokyo, Japan

[73] Assignee: Sony Corporation, Tokyo, Japan

[21] Appl. No.: 713,313

[22] Filed: Jun. 11, 1991

[30] Foreign Application Priority Data

Jun. 29, 1990 [JP] Japan ................................. 2-171711

[51] Int. Cl.⁵ ............................................ G11B 23/02
[52] U.S. Cl. ..................................... 360/132; 242/199
[58] Field of Search .......................... 360/132; 242/199

[56] References Cited

U.S. PATENT DOCUMENTS

| | | | |
|---|---|---|---|
| 3,900,170 | 8/1975 | Serizawa | 360/132 |
| 4,418,373 | 11/1983 | Fujimori et al. | 360/132 |
| 4,607,308 | 8/1986 | Tsuruto et al. | 360/132 |
| 4,672,497 | 6/1987 | Ueda | 360/132 |
| 4,682,259 | 6/1987 | Okamura et al. | 360/132 |
| 4,885,651 | 12/1989 | Shiba et al. | 360/132 |
| 5,023,740 | 6/1991 | Sasaki | 360/132 |
| 5,065,955 | 11/1991 | Fujii | 360/132 |

Primary Examiner—Bruce C. Anderson
Attorney, Agent, or Firm—Alvin Sinderbrand; William S. Frommer

[57] ABSTRACT

A tape cassette for use in a magnetic recording and reproducing apparatus, such as a video tape recorder (VTR), includes a cassette casing having a front wall provided with tape outlets in its opposite side portions, a mouth area between the tape outlets and a recess in one of the tape outlets. A magnetic tape is wound around tape reels in the cassette casing and a portion of the tape between the reels is led out of the tape outlets so as to extend across the mouth area. Front and inner lids are mounted on the cassette casing for angular movements between a closed position in which the portion of the magnetic tape extending across the mouth area is sandwiched between the front and inner lids which thereby protect that portion of the magnetic tape. Further, when the front and inner lids are in the closed position the recess in one of the tape outlets is covered by a tongue portion extending from the front lid. Upon inserting the tape cassette into the VTR, the front lid and the tongue portion thereon contact a lid opening member of the VTR, whereupon the front and inner lids are opened, thereby exposing the portion of the magnetic tape extending across the mouth area and the tape outlets.

5 Claims, 11 Drawing Sheets

TAPE CASSETTE WITH MAGNETIC TAPE OUTLETS OPENABLE AND CLOSABLE BY LIDS

BACKGROUND OF THE INVENTION

1. Field of the Invention

The present invention relates to a tape cassette for use in a recording and reproducing apparatus such as a video tape recorder (VTR) or a variety of information processing apparatus and, more particularly, to a tape cassette having tape outlets for withdrawing a magnetic tape from a cassette casing in which the tape outlets are exposed and covered by respectively opening and closing lids.

2. Description of the Prior Art

One type of conventional tape cassettes for VTRs comprises a cassette casing having a pair of tape outlets located at opposite ends of a front wall thereof for enabling a magnetic tape contained in the cassette casing to be drawn out. The tape cassette also has a front lid over the front wall which is pivotally supported on the cassette casing for normally covering the tape outlets so as to protect the magnetic tape which may otherwise be damaged by foreign matter brought into contact therewith. When the tape cassette is loaded into a VTR, the front lid of the tape cassette is engaged by a lid opening member in the VTR and, as a result, is turned in an upwardly direction so as to expose the magnetic tape. The VTR has a plurality of tape guides which form a predetermined tape path along which the magnetic tape which is drawn out of the cassette casing runs.

The cassette casing also has a recess located in a lower panel near the front wall and contiguous to the tape outlets. The recess serves as a mouth for receiving a tape loading guide which will be positioned behind the portion of the tape that extends between the tape outlets. The tape loading guide pulls the magnetic tape out of the cassette casing when the tape cassette is loaded into the VTR. The mouth opens in a downwardly direction. As a result, even when the front lid is in a closed position, dust or foreign matter may be applied to the magnetic tape. Similarly, a user's finger may be accidentally inserted so as to touch the magnetic tape, thus applying a fingerprint to the magnetic tape. The dust deposit or fingerprint on the magnetic tape may cause signal dropouts when audio and video information is being recorded on or reproduced from the magnetic tape.

Japanese Laid-Open Patent Publication No. 58-128070 discloses a solution to the above problem. That is, a tape cassette is disclosed which is similar to the conventional tape cassette described above, but also includes an inner lid, located inwardly of the front lid, for normally covering the rear side of the magnetic tape extending between the tape outlets. As a result, when the front lid is closed, the magnetic tape between the tape outlets is effectively sandwiched and sealed between the front and inner lids, so that the magnetic tape is reasonably protected against damage from dust particles or the like. When the tape cassette is inserted into a VTR, the front and inner lids are opened, and a tape loading guide is inserted into the mouth so as to load the magnetic tape along the tape path in the VTR.

More specifically, when the tape cassette is inserted horizontally into the VTR and then moved in a downwardly direction into a cassette loading position, the front lid is turned upwardly by a lid opening member which engages the lower edge of the front lid. At the same time, the inner lid is moved in both an upwardly and a rearwardly direction. Therefore, the front and inner lids are opened or moved away from the magnetic tape, thereby opening the tape outlets and the mouth so as to allow the magnetic tape to be loaded along the tape path.

Figure 1A:
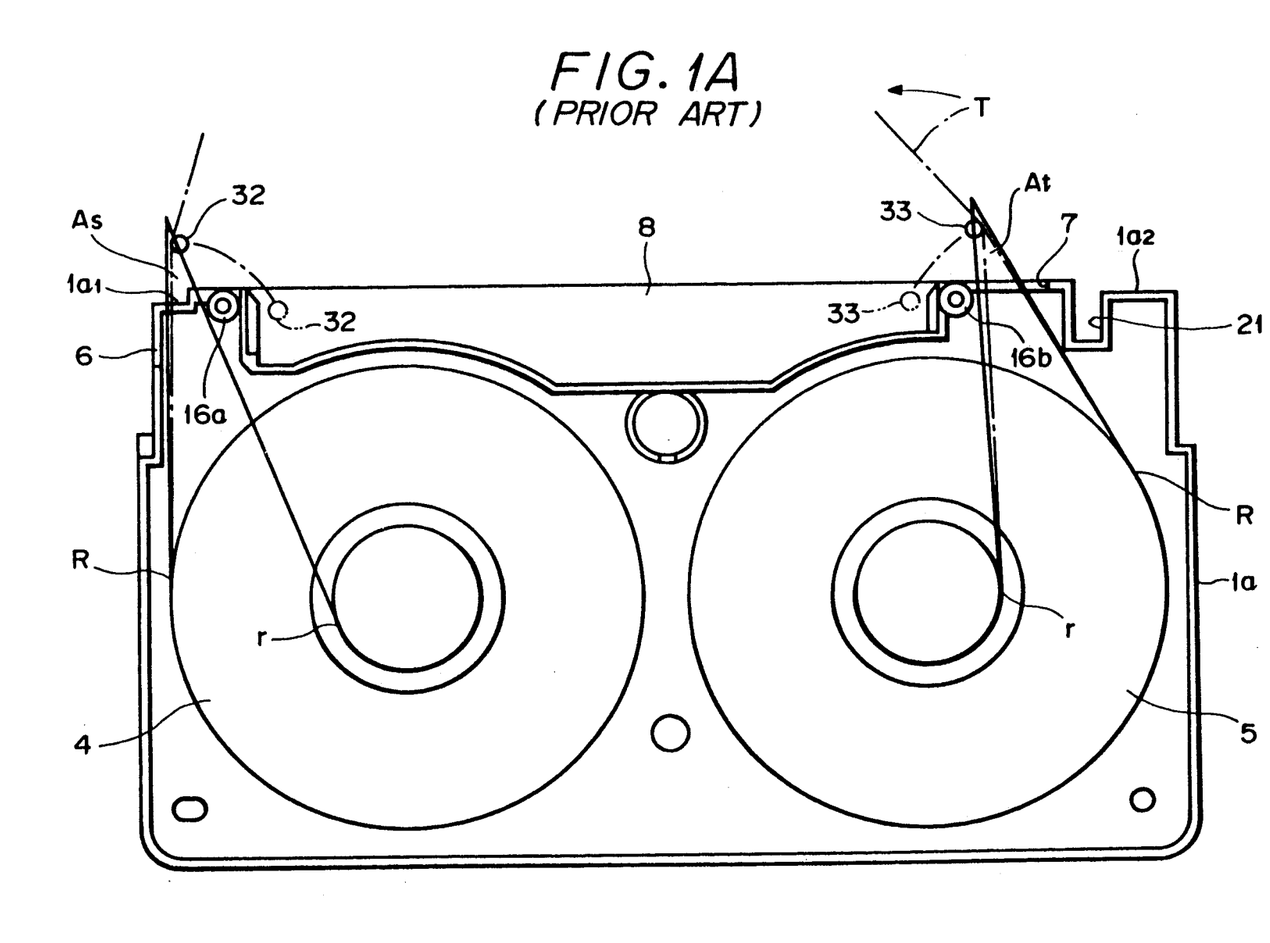
FIGS. 1A and 1B are schematic views showing a conventional tape cassette.
Figure 1B:
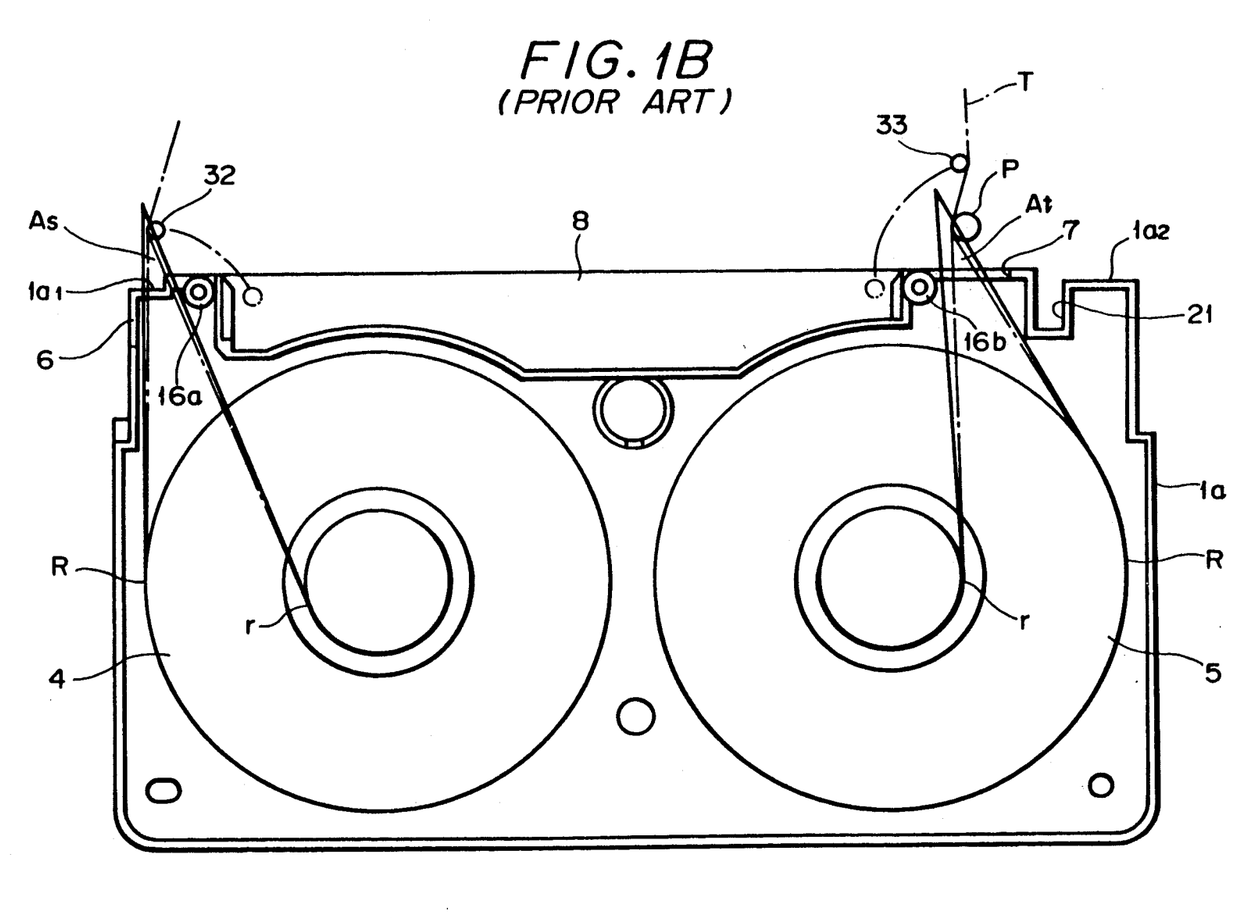

The tape cassettes of the type described above have tape guides disposed within the cassette casing. When the magnetic tape is running, it is in sliding contact with these tape guide. Thus, the accuracy of the tape path is affected by the tape guides. FIGS. 1A and 1B show a conventional tape cassette which is designed to alleviate such a drawback.

As shown in FIGS. 1A and 1B, the tape cassette comprises a cassette casing 1a having a pair of wide tape outlets 6, 7 located at opposite ends of a front wall for enabling a magnetic tape T to be drawn out of the cassette casing 1a. When the tape cassette is loaded into a VTR, the magnetic tape T is drawn out of the cassette casing 1a through the tape outlets 6, 7 and loaded along a tape path in the VTR by a pair of tape loading guides 32, 33 which move in an angular direction and are respectively located near the tape outlets 6, 7. As the diameter of the magnetic tape T of tape reels 4, 5 varies between a maximum diameter R and a minimum diameter r, the magnetic tape T is held out of contact of the cassette casing 1a and inner walls thereof, by tape guides 16a, 16b, respectively and respectively traverses triangular areas As, At at the tape outlets 6, 7. In the structure shown in FIGS. 1A and 1B, the tape path has reduced accuracy.

Abutment surfaces 1a1, 1a2 are located at opposite ends of the front wall. These abutment surfaces 1a1, 1a2 are substantially identical to those of the existing VHS-format type tape cassettes.

The tape cassette of FIGS. 1A and 1B also has a recess 8 located between and contiguous to the tape outlets 6, 7, and serves as a mouth for receiving the tape loading guides 32, 33 for loading the magnetic tape T.

In tape cassettes having front and inner lids, when the front and inner lids are to be opened, the inner lid cannot normally be moved away from the magnetic tape unless the front lid is rotated through an angle which is greater than that through which front lids of tape cassettes without inner lids are rotated. As a result, the lid opening member for engaging and rotating or turning the front lid for tape cassettes having front and inner lids is larger in height than that associated with tape cassettes without inner lids.

For this reason, the tape cassette having both front and inner lids cannot normally be used in VTRs designed for use with general type tape cassettes which do not have inner lids. In other words, tape cassettes having only front lids and tape cassettes having both front and inner lids may not be used interchangeably in conventional VTRs.

In FIGS. 1A and 1B, the wide tape outlets 6, 7 allow the magnetic tape T to respectively traverse the triangular areas As, At while the magnetic tape is being drawn out of the cassette casing 1a and guided by the tape loading guides 32, 33 so as to follow the tape path. The front wall of the cassette casing has a recess 21, located adjacent to and outwardly of the tape outlet 7, which is positioned near the tape reel 5 which, for example, may be a takeup reel. The recess 21 serves to receive the lid opening member for opening the front lid of the tape cassette. The triangular area At, at the tape outlet 7, is shaped so as to point inwardly in order to prevent the magnetic tape T from contacting the inner wall portion of the recess 21 which projects into the cassette casing.

The tape path is thus required to be located inwardly of the arrow shown in FIG. 1A. Such a requirement imposes a limitation which causes effective utilization of the deck surface in the VTR not to be achieved. To avoid the above shortcoming, a guide post P may be added in front of the tape outlet 7, as shown in FIG. 1B, so as to direct the magnetic tape T outwardly. However, since the coated magnetic layer of the magnetic tape T is in sliding contact with the guide post P, the magnetic tape T may be damaged by the guide post P.

OBJECTS AND SUMMARY OF THE INVENTION

Accordingly, it is an object of the present invention to provide a tape cassette which avoids the above-mentioned disadvantages of the prior art.

More specifically, it is an object of the present invention to provide a tape cassette having a front lid and an inner lid attached to the front lid for preventing dust from being supplied to a magnetic tape contained therein and having a wide region on opposite sides of a cassette casing for enabling the magnetic tape to be withdrawn from the cassette casing, in which the tape cassette is arranged so as to enable its use in a recording and/or reproducing apparatus designed for use with tape cassettes without inner lids.

According to an aspect of the present invention, a tape cassette for use in a recording and/or reproducing apparatus comprises a cassette casing including a front wall having a pair of tape outlets located at opposite side portions of the front wall, a mouth area located between the tape ou.lets and a recess located within one of the tape outlets for receiving a lid opening member of the recording and/or reproducing apparatus; a pair of tape reels rotatably disposed in the cassette casing; a magnetic tape wound around the tape reels and having a run between the reels which is led out of the tape outlets so as to extend across the mouth area; a front lid pivotally mounted on the cassette casing; an inner lid mounted for angular movements within the front lid; the front and inner lids being angularly movable in response to the lid opening member extending through the recess and acting against the front lid when the tape cassette is inserted into a loading position in the recording and/or reproducing apparatus so as to open the front and inner lids and expose the tape outlets and the run of the magnetic tape extending across the mouth area, a tongue being provided on the front lid for engagement by the lid opening member in a final part of the angular movements of the front and inner lids to their open positions; in the absence of the lid opening member pressing against the front lid, the front and inner lids are in closed positions in which the front lid covers the front surface of the magnetic tape run and the tape outlets, while the inner lid covers the rear surface of the tape run and the tongue covers the recess.

When the tape cassette is inserted into the cassette loading position in a magnetic recording and reproducing apparatus such as a VTR, the front lid is opened by the lid opening member. In the final portion of the lid opening process, the front lid is pushed in a substantially upwardly direction by the lid opening member by engaging the abutting tongue, thereby fully opening the mouth. At the same time, the inner lid is moved away from the magnetic tape between the tape outlets. With the mouth fully opened, the magnetic tape may be loaded along the tape path in the magnetic recording and reproducing apparatus.

Since the front lid is opened upwardly by the lid opening member by utilizing the abutting tongue, the lid opening member may have the same height as that of a lid opening member used to open the front lid of a general type tape cassette which does not have an inner lid. Consequently, the tape cassette according to the present invention may utilize the same lid opening member as that utilized by conventional type tape cassettes.

One of the tape outlets is wide enough to contain the front portion of the recess. As a result, there is provided a tape outlet having a relatively wide region and a second tape outlet on opposite sides of the cassette casing for withdrawing the magnetic tape from the cassette casing. With such an arrangement, tape guide posts, which would otherwise be in sliding contact with the magnetic layer of the magnetic tape and hence damage the magnetic layer, are unnecessary. The tape path can therefore be designed with more freedom or flexibility.

The recess in the wide tape outlet is covered by the abutting tongue when the front lid is closed. As a result, dust particles are prevented from entering the cassette casing through the recess when the front lid is closed, thereby protecting the magnetic tape stored in the cassette casing from dust-induced damage.

The above, and other objects, features and advantages of the present invention, will become apparent from the following detailed description of illustrative embodiments of the present invention when read in conjunction with the accompanying drawings, in which corresponding parts are identified by the same reference numerals.

DETAILED DESCRIPTION OF THE PREFERRED EMBODIMENTS

Figure 2:
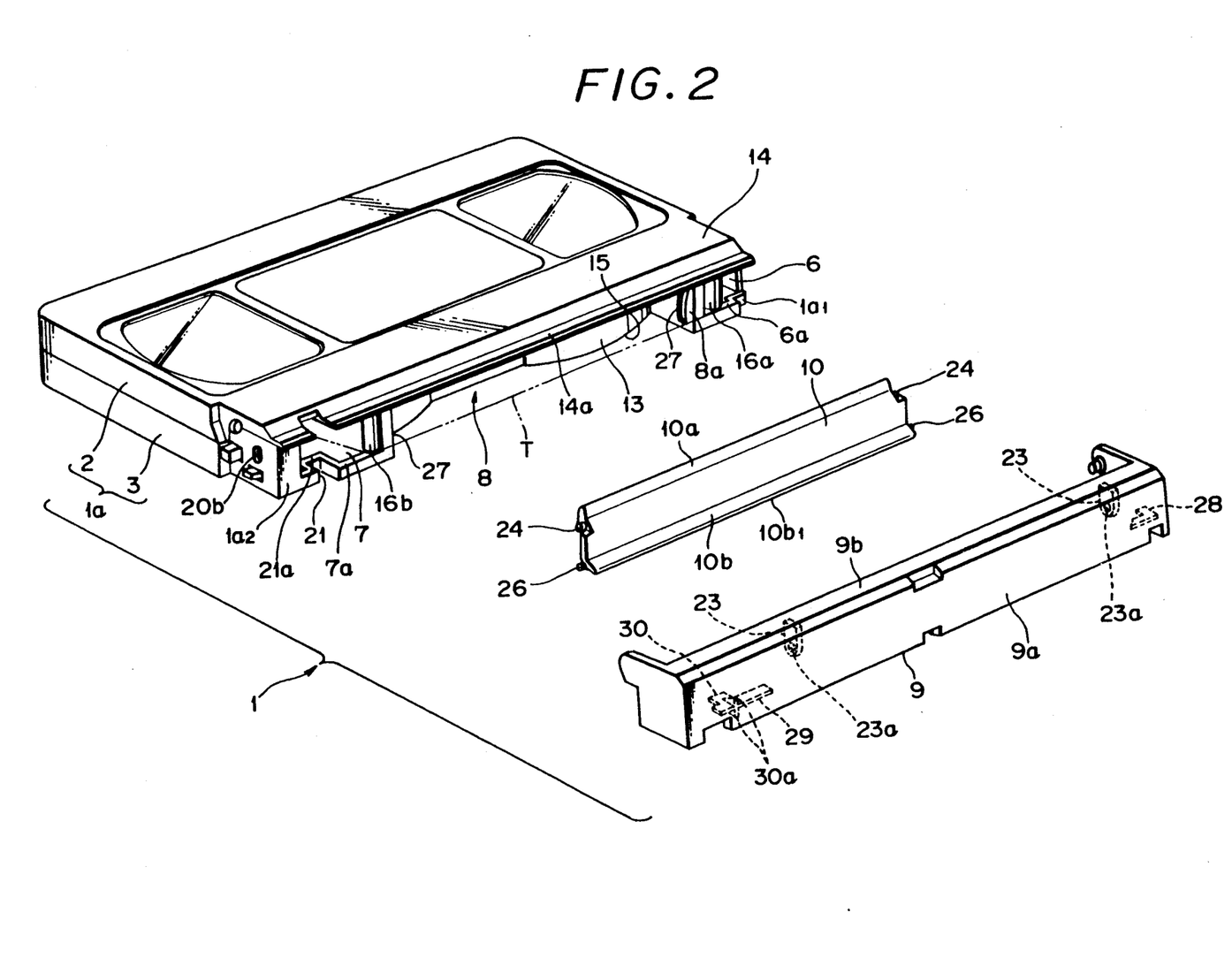
FIG. 2 is an exploded perspective view of a tape cassette according to an embodiment of the present invention.
Figures 3, 4:
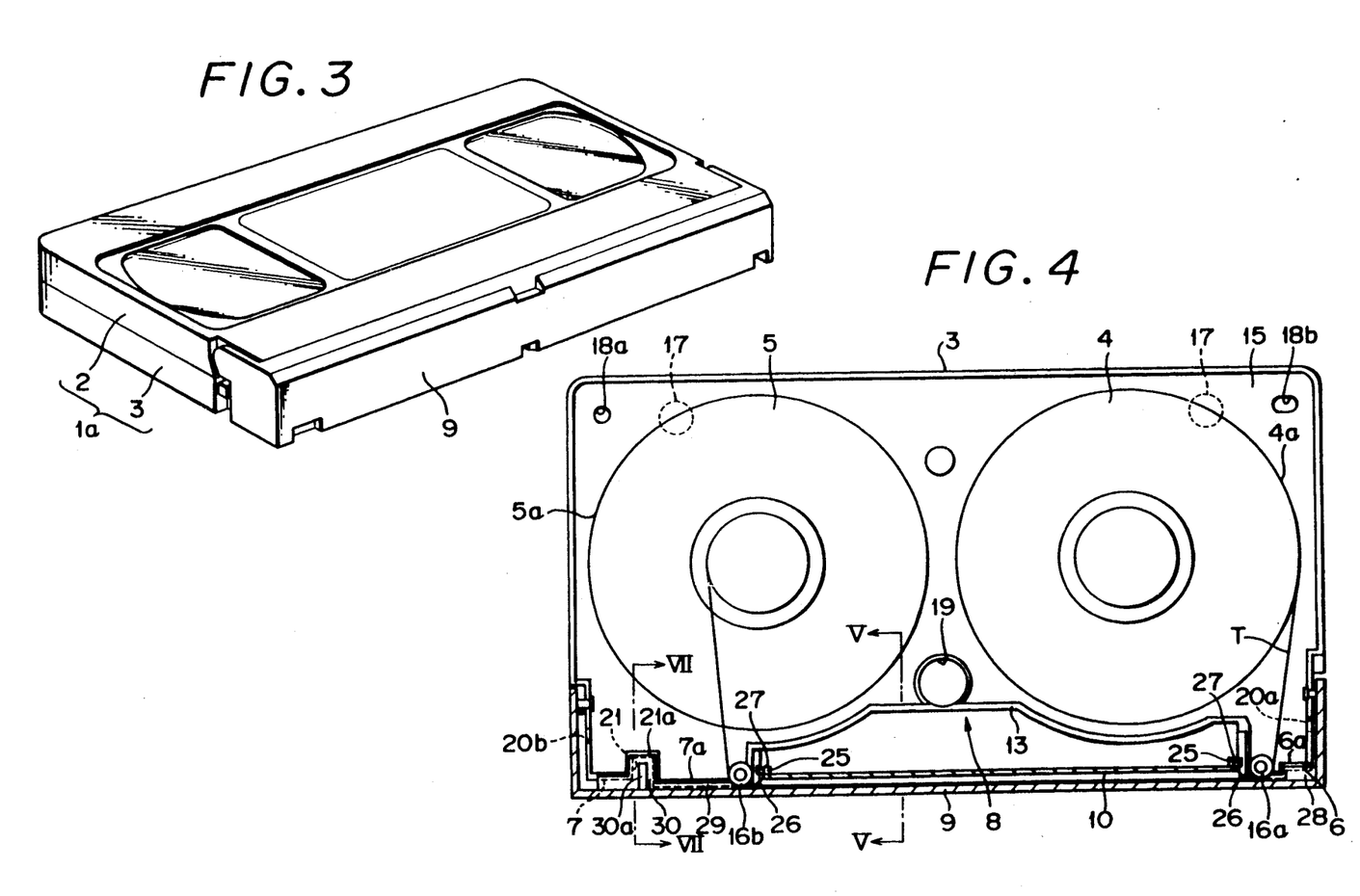
FIG. 3 is a perspective view of the tape cassette shown in FIG. 2.
FIG. 4 is a longitudinal cross-sectional view of the tape cassette shown in FIG. 3.

FIG. 2 shows a tape cassette 1 according to an embodiment of the present invention. The tape cassette 1 includes a cassette casing 1a composed of a rectangular upper half 2 and a rectangular lower half 3 which, for example, may be molded from synthetic resin and fitted together. As shown in FIG. 4, a pair of tape reels 4, 5 is rotatably contained in the cassette casing 1a, and a magnetic tape T is wound around and extends between the tape reels 4, 5.

Figure 6:
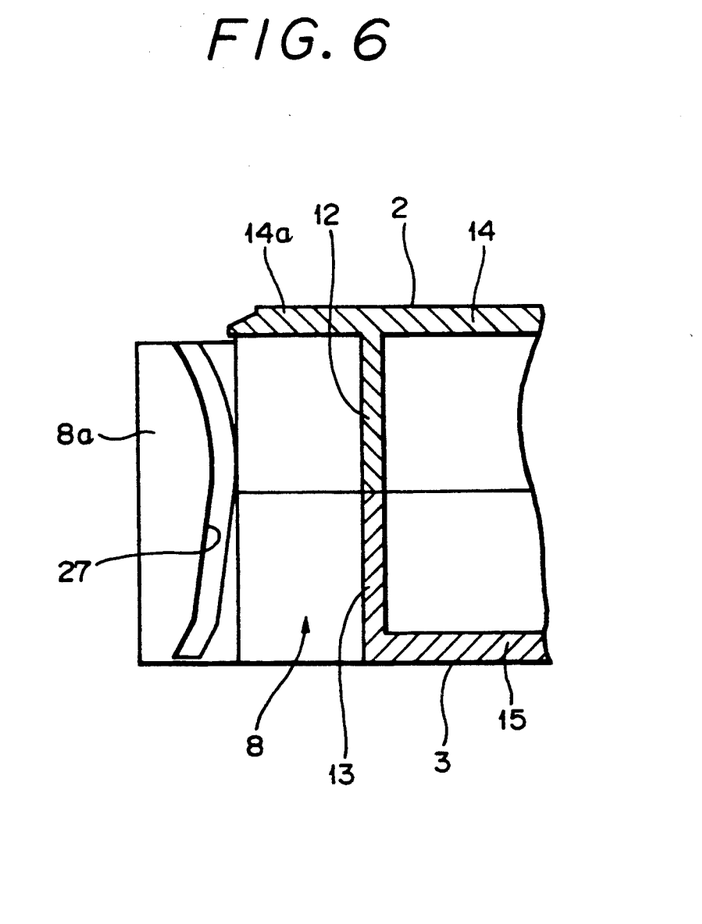
FIG. 6 is an enlarged cross-sectional view of a guide groove.

The cassette casing 1a has a pair of relatively wide tape outlets 6, 7 located at opposite ends of a front wall. The upper and lower casing halves 2, 3 have a recess centrally located in respective front walls 12, 13 (see FIG. 6) between the tape outlets 6, 7. More specifically, as shown in FIG. 6, the upper half 2 has an upper wall 14 with a front edge 14a extending in a forwardly direction beyond the front wall 12. Similarly, the lower half 3 has a lower wall 15 with a front edge extending along the front wall 13. The front walls 12, 13 of the upper and lower halves 2, 3, respectively, and the front edge 14a of the upper wall 14 of the upper half 2 define the above-described recess. This recess serves as a mouth 8 for receiving tape loading guides which are utilized for withdrawing the magnetic tape T from the cassette casing 1a.

The front side of the mouth 8 is normally covered or closed by a front lid 9, as shown in FIG. 3, which can be turned in an upwardly direction so as to open the mouth 8. The mouth 8 is opened on its lower side.

The longitudinal dimension of the upper and lower halves 2, 3 and the front lid 9 are either the same as or slightly larger than that of a corresponding VHS-format tape cassette.

As shown in FIG. 4, upstanding tape guides 16a, 16b are mounted inward of the tape outlets 6, 7, respectively, near the mouth 8. The tape guide 16b is held as to be substantially in line with the center of the tape reel 5a when the cassette casing 1a is viewed inwardly from the front lid 9.

As further shown in FIG. 4, the rear portion of the lower wall 15 of the lower half 3 has reference bearing surfaces 17, a reference pin receiving circular hole 18a, and a reference pin receiving oblong hole 18b and, in the front portion thereof, has a sensor inserting hole 19 and light receiving holes 20a, 20b. The lower wall 15 also has a recess 21 located in its front edge near the tape reel 5 which, for example, may be a takeup reel. The recess 21 is adapted to receive therein a lid opening member of a magnetic recording and reproducing apparatus such as a VTR.

The recess 21 is positioned in accordance with the VHS format, that is, within the tape outlet 7 which is located adjacent to the tape reel 5. The tape outlet 7 has a relatively wide configuration and contains therein a front portion of the recess 21. The tape outlet 7 has a front edge 7a which in turn, includes a peripheral edge 21a of the recess 21. The tape outlet 6 is positioned adjacent to the tape reel 4 which, for example, may be a supply reel. The tape outlet 6 has a front edge 6a. The front edges 6a, 7a may be formed as projecting edges or ridges which are slightly lower than lower flanges 4a, 5a of the tape reels 4, 5, respectively.

An inner lid 10 is mounted on the front lid 9 so as to be spaced-apart from an inner surface of a front wall 9a of the front lid, as shown in FIGS. 2 and 4. More specifically, the front lid 9 has a substantially C-shaped cross section and has a pair of laterally spaced brackets 23 projecting from an inner surface of an upper wall 9b which is contiguous to the front wall 9a. Each of the brackets 23 has a respective pin hole 23a for inserting therein a respective one of a pair of support pin 24 which project laterally from opposite sides of an upper portion of the inner lid 10.

As a result, the inner lid 10 is angularly movable about the support pins 24 with respect to the front lid 9. The inner lid 10 has an upper end 10a which is held against an inner surface of the upper wall 9b of the front lid 9 and, has an inclined lower end 10b which protects in a forwardly direction whose edge 10b1 is held against an inner surface of the front wall 9a of the front lid 9. Each of a pair of brackets 25 (FIG. 4) projects laterally from opposite sides of the inner lid 10 just behind the lower end 10b. Projecting from each of the brackets 25 is a respective one of guide pins 26 which extend laterally in an outwardly direction and which are each inserted into a respective one of guide grooves 27 which, in turn, are respectively located in inner wall surfaces 8a of the cassette casing 1a which partly define the mouth 8. Each of the guide grooves 27, as shown in FIG. 6, is composed of a lower portion which is inclined in a rearwardly direction, a central portion which is substantially vertical, and an upper portion which is inclined in a forwardly direction.

Abutting ledges 28, 29 are respectively located at opposite lower ends of an inner surface of the front wall 9a of the front lid 9 so as to be in alignment with the tape outlets 6, 7 of the cassette casing 1a. The abutting ledge 29, which is aligned with the tape outlet 7, has an integral abutting tongue 30 which is shaped so as to cover the upper end of the recess 21.

When the front lid 9 is closed so as to close the mouth 8 of the cassette casing 1a, the abutting ledges 28, 29 are respectively held against upper surfaces of the front edges 6a, 7a of the tape outlets 6, 7, and the abutting tongue 30, which is integral with the abutting ledge 29, abuts against an upper surface of the peripheral edge 21a of the recess 21. Therefore, the tape outlets 6, 7 are closed or covered by the inner surface of the front wall 9a of the front lid 9 and the abutting ledges 28, 29, and the recess 21 is closed or covered by the abutting tongue 30. As a result, in this situation, the interior of the cassette casing 1a may be considered as being substantially hermetically sealed.

The abutting tongue 30 is reinforced by ribs 30a, which are joined to and extend between the abutting tongue 30 and the inner surface of the front wall 9a of the front lid 9.

Figure 5A:
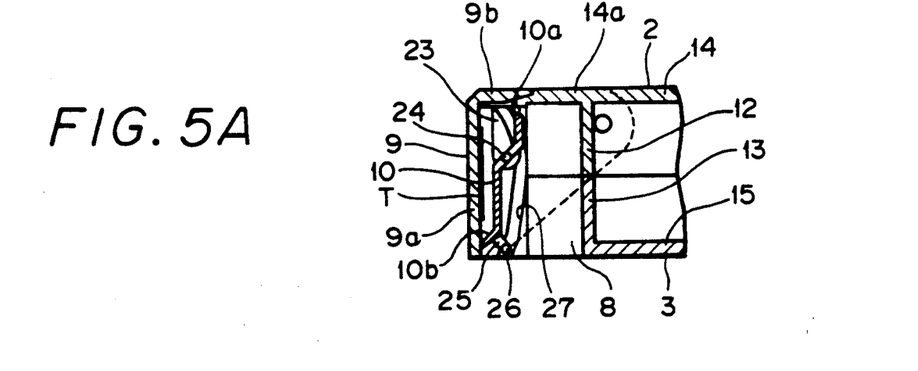
FIGS. 5A through 5D are cross-sectional views taken along line V—V of FIG. 4, showing the manner in which front and inner lids are opened.

The length of the magnetic tape T which is led out from the tape outlets 6, 7 and extends under tension in the front area of the mouth 8 is normally covered on its front side by the front lid 9 and on its rear side by the inner lid 10, as shown in FIGS. 4 and 5A. Since the upper and lower edges of the inner lid 10 are held against the front lid 9, the length of the magnetic tape T which is positioned in the mouth 8 is substantially fully covered so as to be protected against damage due to dust or the like. Therefore, the tape cassette 1 provides a relatively high degree of protection for the magnetic tape T.

When the tape cassette 1 is inserted into a video tape recorder (VTR), the front lid 9 and the inner lid 10 are opened so as to expose the front and rear sides of the magnetic tape T in the mouth 8, and tape loading guides are inserted in the mouth 8 behind the tape T for loading the magnetic tape T in the VTR.

Figures 7A, 7B, 7C, 7D, 7E:
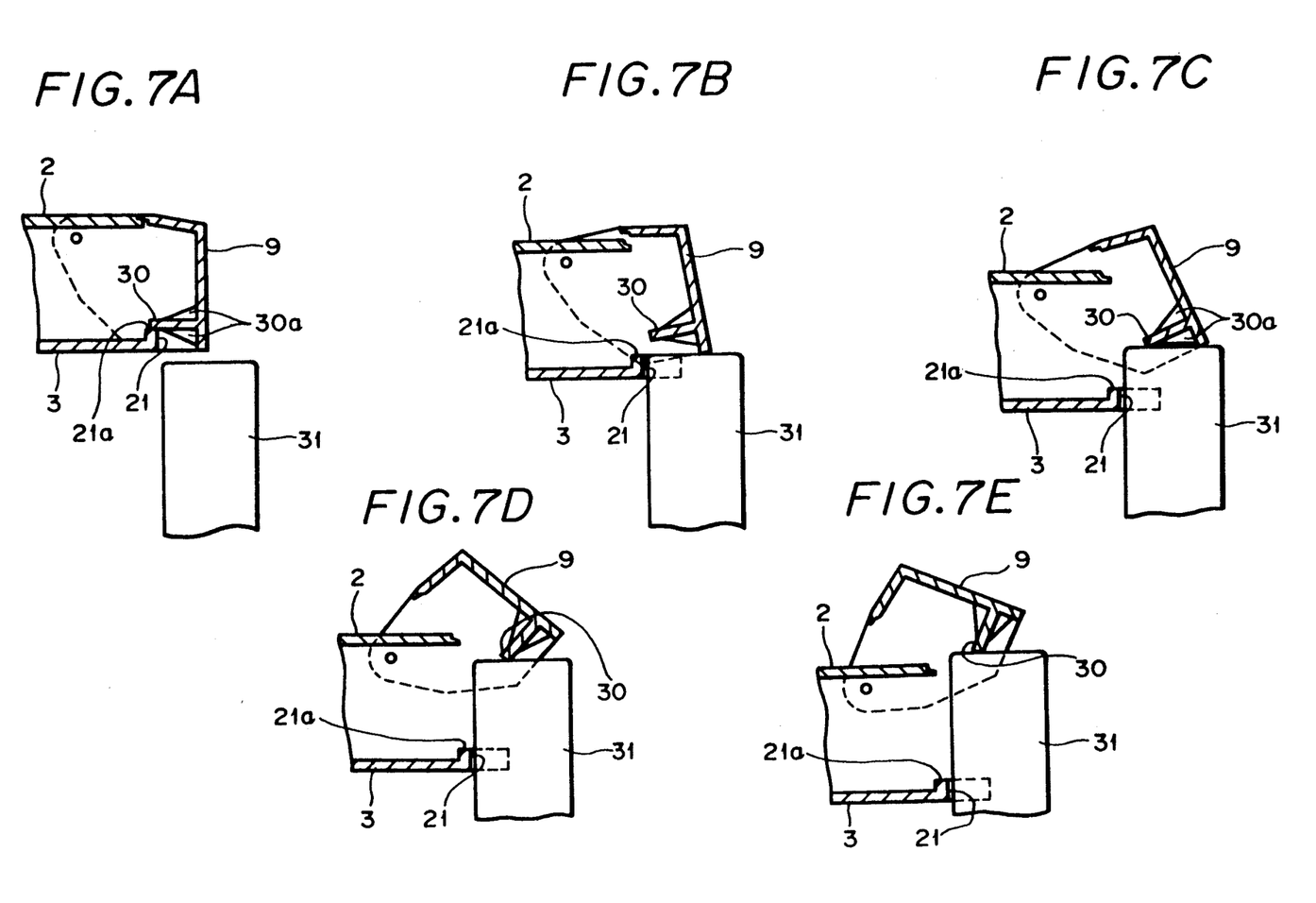
FIGS. 7A through 7E are cross-sectional views taken front and inner lids are opened.

More specifically, when the tape cassette 1 is inserted into a cassette holder in the VTR, the cassette is progressively lowered into a cassette loading position, whereupon the lower end of the front lid 9 is engaged by the upper end of a lid opening member 31 (FIG. 7A) which is located in the cassette loading position in vertical alignment with the recess 21 of the cassette casing 1a. As the tape cassette 1 is moved further downward into the cassette loading position, the lid opening member 31 is inserted, from below, into the recess 21, thereby pushing the front lid 9 upwardly. The front lid 9 now starts to be moved or rotated in an upward direction as shown in FIG. 7B. While the front lid 9 is being rotated upwardly, the point of contact with the lid opening member 31 shifts from the lower end of the front lid 9 to the rear end of the abutting tongue 30, as shown in FIG. 7C. On continued downward movement of the tape cassette 1, the front lid 9 is pushed further upward by the lid opening member 31 due to its contact with only the abutting tongue 30, as shown in FIG. 7D. Thus, when the tape cassette 1 is fully loaded in the cassette loading position, the front lid 9 has been rotated upwardly by the lid opening member 31 so as to be fully opened, as shown in FIG. 7E. As is to be appreciated, the final vertical displacement of the front lid 9, when it is fully opened, is greater than it would be if the front lid 9 were rotated upwardly by the lid opening member 31 engaging only the lower end of the front lid 9.

Figure 5B:
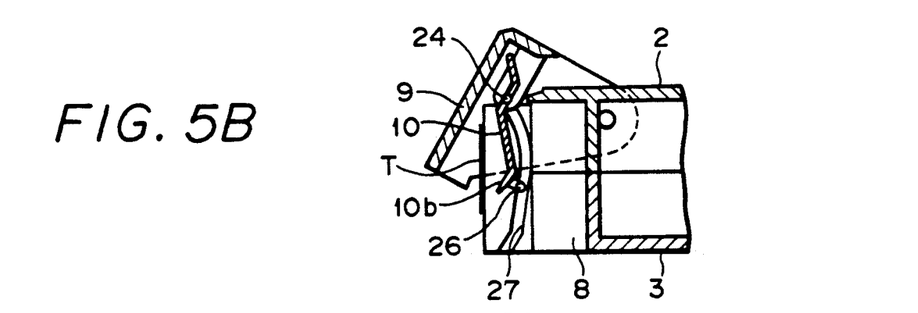

While the front lid 9 is being opened, the inner lid 10 is moved in an upward direction therewith by the support pins 24. As the guide pins 26 are respectively guided by the lower portions of the guide grooves 27, which are inclined in a rearward direction, the inner lid 10 is moved upwardly and rearwardly, as shown in FIG. 5B, away from the inner surface of the front wall 9a of the front lid 9, with the lower end 10b moving quickly in a rearward direction away from the magnetic tape T.

Figure 5C:
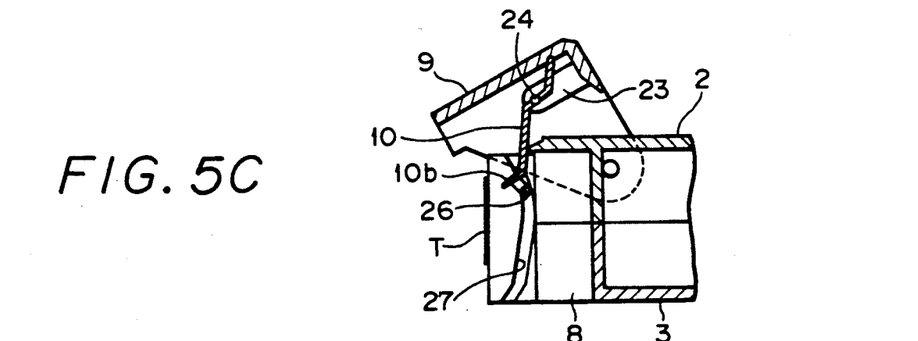

During an intermediate period of the lid opening operation, as shown in FIG. 5C, the lower end 10b of the inner lid 10 is moved substantially vertically while maintaining a sufficiently spaced-apart relation to the rear side of the magnetic tape T as the guide pins 26 are respectively guided by the central substantially vertical portions of the guide grooves 27.

Figure 5D:
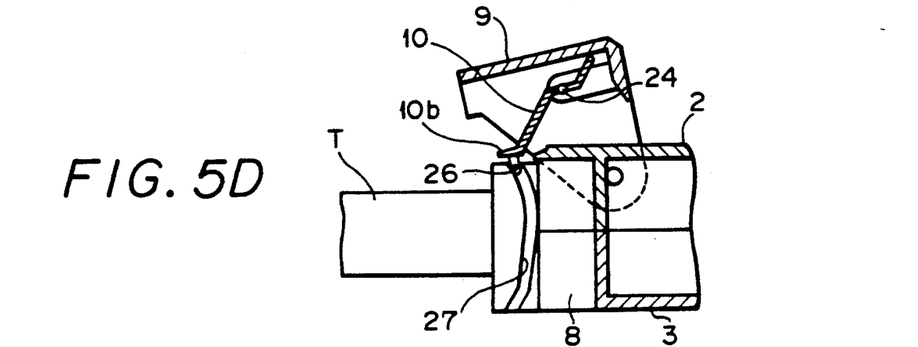

During a final period of the lid opening operation, as shown in FIG. 5D, the guide pins 26 are respectively guided by the upper forwardly inclined portions of the guide grooves 27, causing the inner lid 10 to turn due to the support pins 24, so that the lower end 10b is moved into a position above the mouth 8 of the cassette casing 1a, thereby fully opening the mouth 8.

Figure 8:
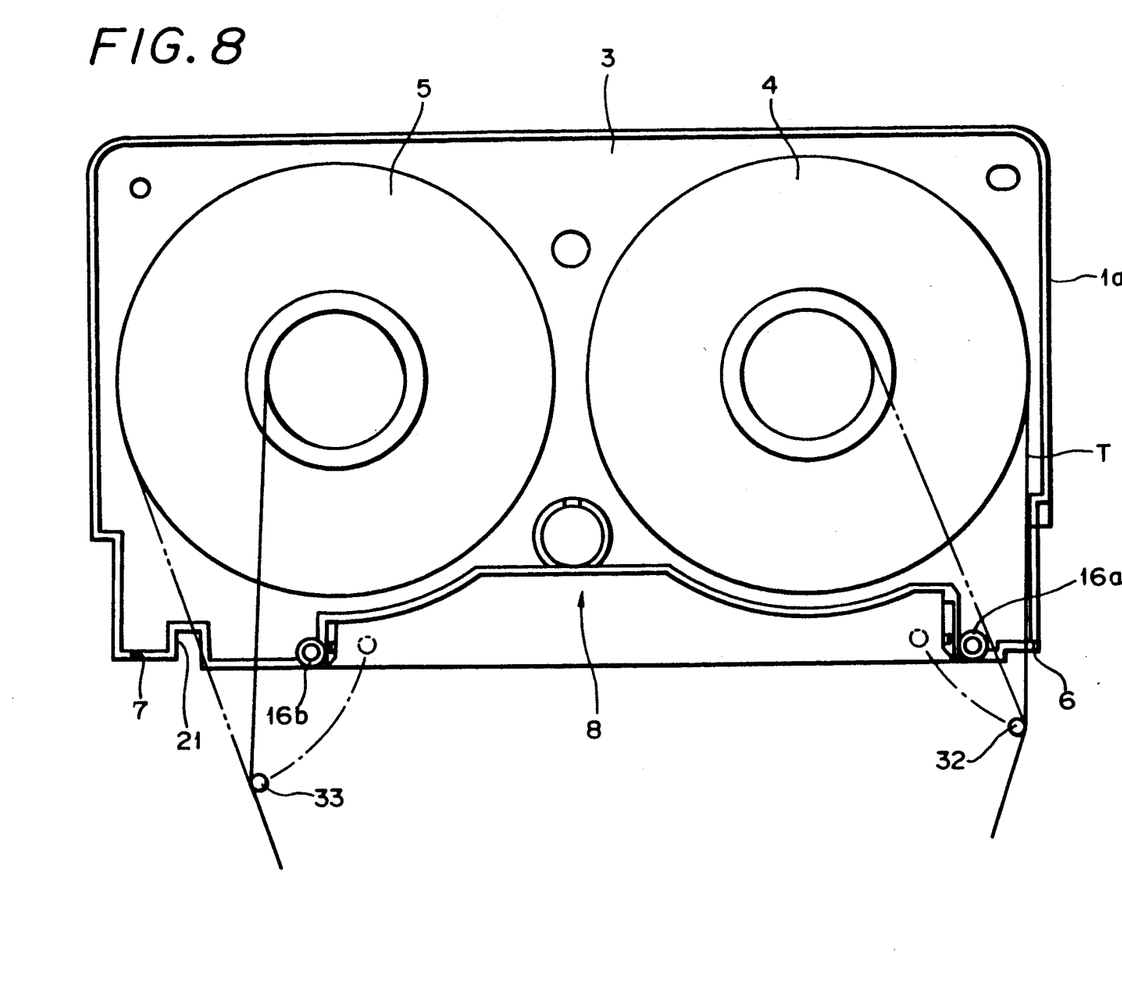
FIG. 8 is a schematic view of the tape cassette of FIG. 2, to which reference will be made in explaining a tape loading operation.

After the front lid 9 and the inner lid 10 are opened so as to fully open the tape outlets 6, 7 and the mouth 8, tape loading guides 32, 33, which have been inserted in the mouth 8, are moved out of the mouth 8, as shown in FIG. 8, so as to withdraw the magnetic tape T from the tape outlets 6, 7.

Since the tape outlets 6, 7 are relatively wide, the magnetic tape T can be led out of the cassette casing 1a without contacting the tape guides 16a, 16b, respectively. The tape outlet 7, which is near the takeup tape reel 5, has a relatively wide shape and contains the recess 21. As a result, the magnetic tape T can be led out from the tape outlet 7 relatively close to an outer side of the tape cassette 1, as shown in FIG. 8.

When the tape cassette 1 is unloaded from the VTR, the front lid 9 and the inner lid 10 are closed in a sequence which is the opposite of the above-described lid opening process.

As described above, the front lid 9, to which the inner lid 10 is attached, has the abutting tongue 30 and during the final portion of the lid opening operation, the front lid 9 is opened by the lid opening member 31 contacting the abutting tongue 30. Therefore, even if the lid opening member 31 is of a height designed for opening the front lid of a general type tape cassette having no inner lid, e.g., a VHS-format tape cassette, the front lid 9 can be sufficiently opened, with the inner lid 10 moved above the mouth 8, by the lid opening member 31, so as to fully open the mouth 8.

Thus, the tape cassette 1 according to the present invention is compatible with general type VHS-format tape cassettes with respect to the lid opening member 31.

In the above-described embodiment, the front lid 9 also has bias means for effectively urging itself toward a closing direction and lock means for locking itself in a closed position. Although these bias and lock means are not shown or described in detail herein, they are well known in the art and, as such, a detailed description thereof is unnecessary.

Figure 9:
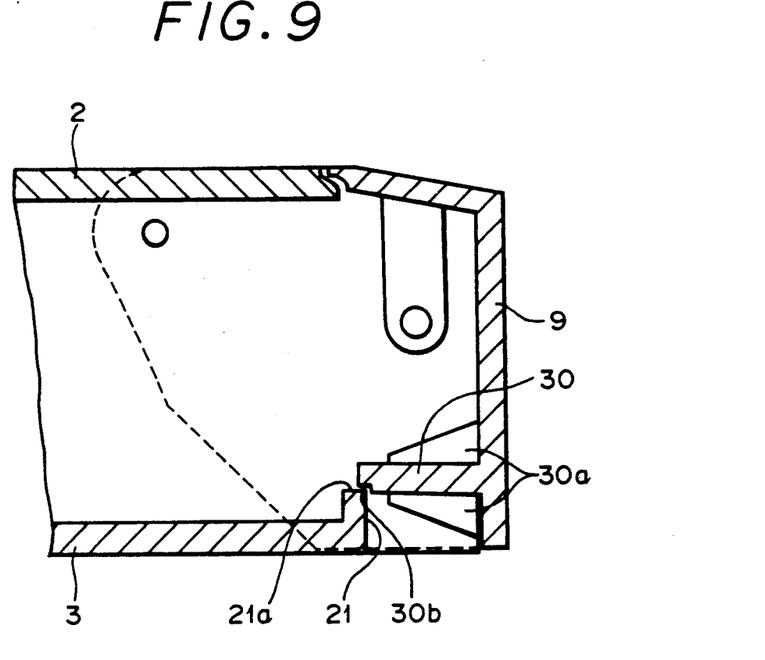
FIG. 9 is an enlarged cross-sectional view of a portion of a tape cassette according to another embodiment of the present invention.
Figure 10:
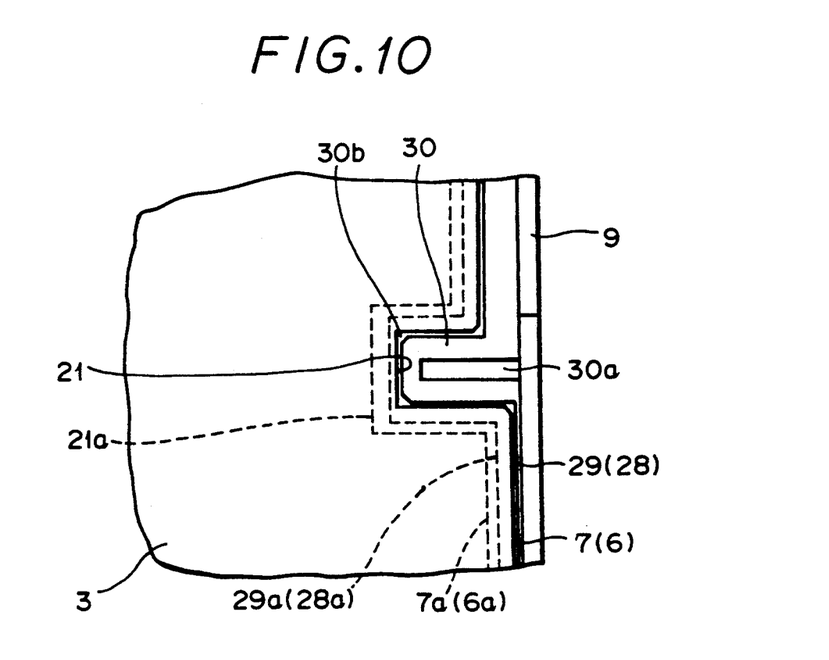
FIG. 10 is a bottom view of the tape cassette shown in FIG. 9.

FIGS. 9 and 10 show a tape cassette according to another embodiment of the present invention, in which the tape cassette is designed for even better protection against dust when the front lid is closed. More specifically, the abutting ledges 28, 29 and the abutting tongue 30 of the front lid 9 have respective lower peripheral step surfaces 28a, 29a and 30b which respectively interfit with the front edges 6a, 7a of the tape outlets 6, 7 and the peripheral edge 21a of the recess 21. For smooth fitting engagement between the lower peripheral step surfaces 29a, 30b and the edges 7a, 21a, the corners between the front edge 7a and the peripheral edge 21a and the corners of the bevelled, as shown in FIG. 10.

Figure 11:
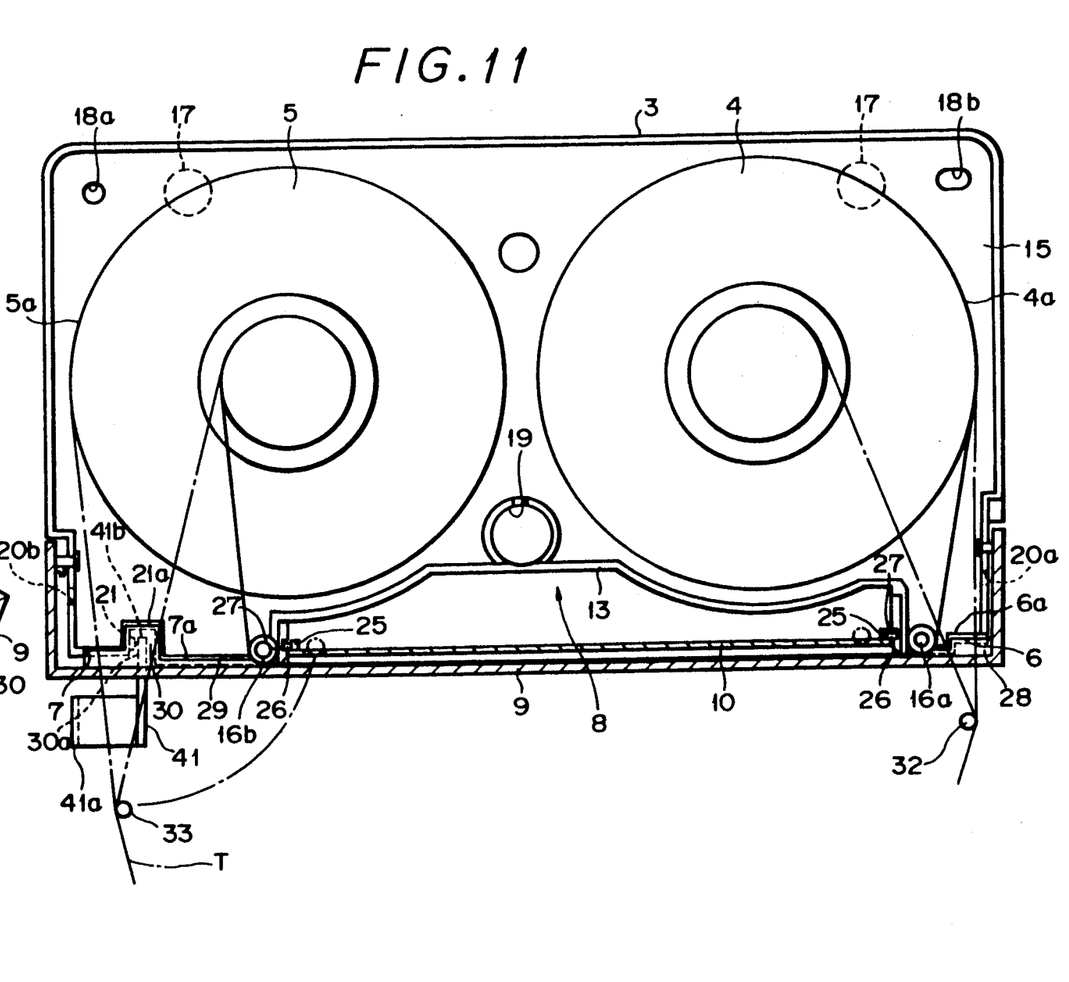
FIG. 11 is a longitudinal cross-sectional view of a tape cassette according to still another embodiment of the present invention, showing the manner in which front and inner lids are opened.
Figure 12:
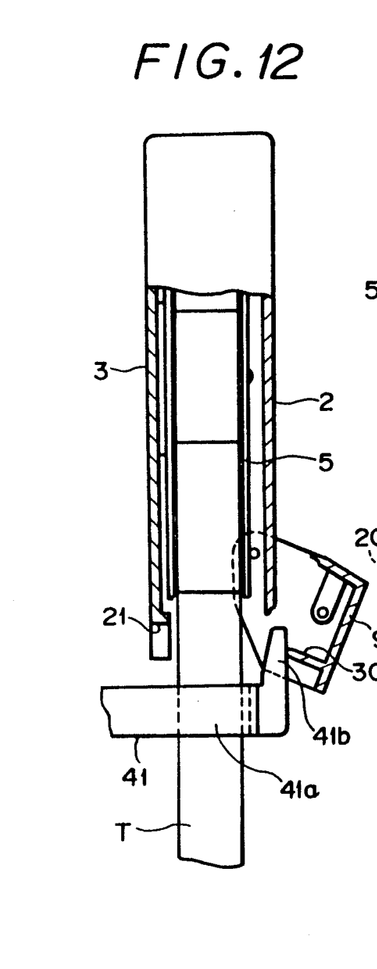
FIG. 12 is a transverse cross-sectional view of the tape cassette shown in FIG. 11 with the lids opened.

FIGS. 11 and 12 show a tape cassette according to still another embodiment of the present invention. The front lid 9 of the tape cassette 1 shown in FIGS. 11 and 12 is opened by a lid opening member 41 which has the same height as the lid opening member 31 shown in FIGS. 7A through 7E. The lid opening member 41 has a vertical support base 41a which is disposed in outwardly spaced-apart relationship to the recess 21. The support base 41a has an upper end portion which is bent to one side, and the bent end portion has a tip end which is also bent in an upward direction to form an engaging finger 41b which is aligned with the recess 21. The engaging finger 41b can be inserted into the recess 21 when the tape cassette 1 is loaded into a VTR.

When the tape cassette 1 of FIGS. 11 and 12 is lowered into the cassette loading position of the VTR, the engaging finger 41b is inserted into the recess 21 and engages the lower end of the front lid 9. On further descent of the tape cassette 1, the front lid 9 is pushed and rotated upwardly by the engaging finger 41b. During the lowering of the tape cassette 1, the point of contact with the engaging finger 41b is shifted to the rear end of the abutting tongue 30. Thus, the front lid 9 is rotated upwardly by the engaging finger 4ab. As result, the tape outlets 6, 7 and the mouth 8 are opened so as to allow the magnetic tape T to be withdrawn from the cassette casing.

When the magnetic tape T is withdrawn from the cassette casing by the tape loading guides 32, 33, the magnetic tape T is led out from the tape outlet 7 below the engaging finger 41b of the lid opening member 41, because the support base 41a is positioned out of the tape path. Thus, the magnetic tape T may be led out from the tape outlet 7 relatively close to an outer side of the tape cassette, without an additional tape guide(s) which may otherwise hold the magnetic layer of the magnetic tape T in sliding contact thereof. Consequently, the tape path in the VTR can be designed with a greater degree of freedom of flexibility.

Figure 13:
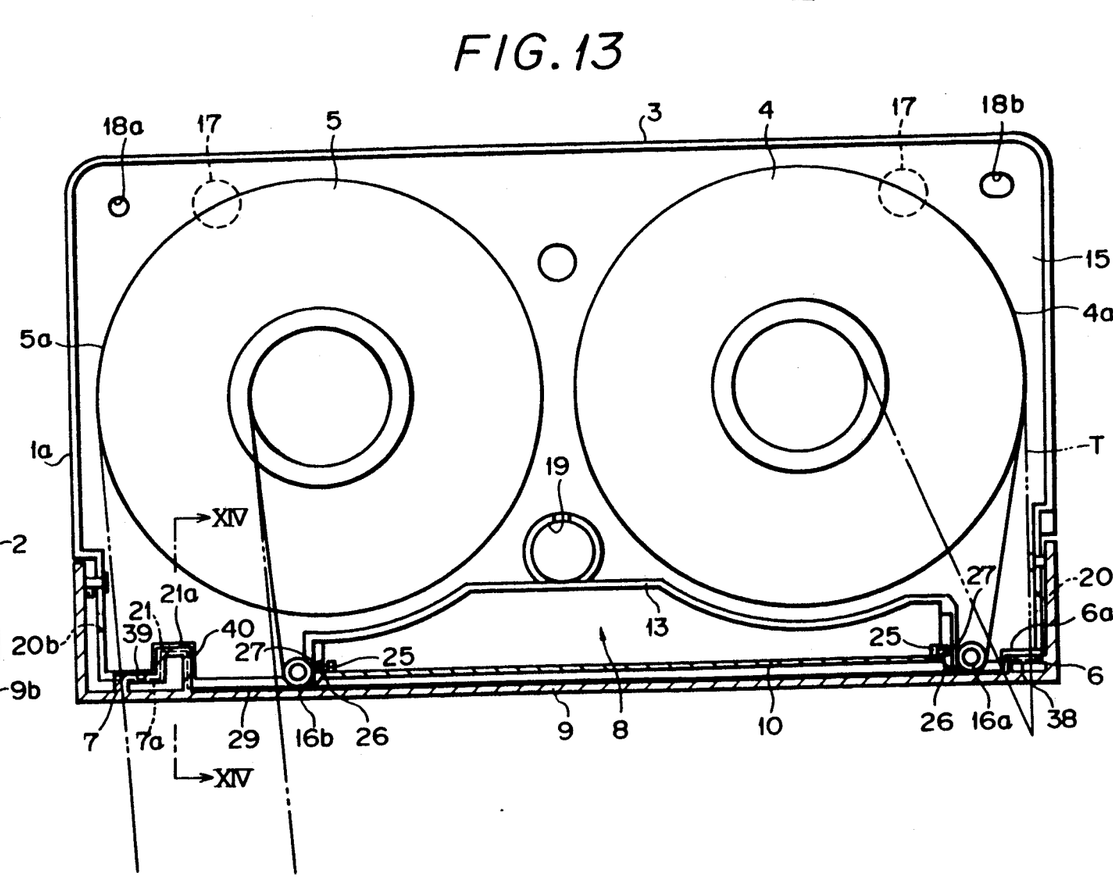
FIG. 13 is a longitudinal cross-sectional view of a tape cassette according to yet still another embodiment of the present invention.
Figure 14:
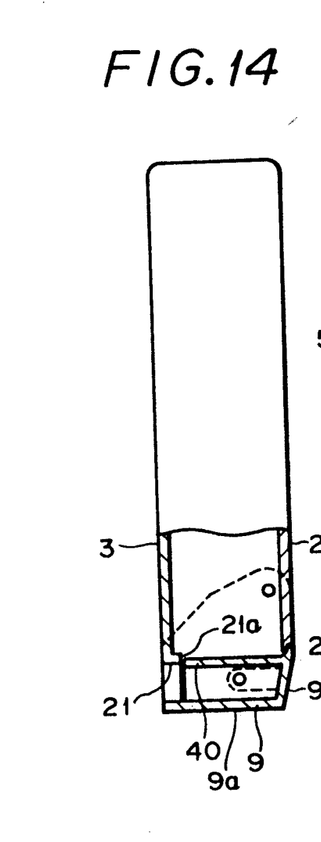
FIG. 14 is a transverse cross-sectional view taken along line XIV—XIV of FIG. 13.

FIGS. 13 and 14 show a tape cassette according to yet still another embodiment of the present invention. The tape cassette shown in FIGS. 13 and 14 has differently shaped structures for closing or covering the tape outlets 6, 7 and the recess 21

The front lid 9, shown in FIGS. 13 and 14, is ejected from a mold in a different direction after it is molded of synthetic resin. More specifically, the front lid 9 has abutting ledges 38, 39 and an abutting tongue 40 which extend from the upper wall 9b and are parallel to the front wall 9a. When the front lid 9 is closed, the lower edges of the abutting ledges 38, 39 and the abutting tongue 40 are held against the front edges 6a, 7a of the tape outlets 6, 7 and the peripheral edge 21a of the recess 21, respectively, thereby closing or covering the tape outlets 6, 7 and the recess 21.

The abutting ledges 38, 39 and the abutting tongue 40 of the front lid 9 are also effective to prevent dust from entering the cassette casing 1a when the front lid 9 is closed. When the front lid 9 is to be opened, a lid opening member in a VTR engages and pushes the lower edge of the abutting tongue 40 upwardly so as to lift and open the front lid 9 to a sufficient height. Accordingly, the tape outlets 6, 7 and the recess 21 are sufficiently exposed by opening the front lid 9 along with the combined inner lid 10.

The tape cassettes according to all of the above-described embodiments may have dimensions different from those of the VHS-format type tape cassette, however, the recesses 21 of the tape cassettes should be positioned so as to enable the lid opening member in VTRs designed according to the VHS format to be inserted therein.

With the present invention, as described above, the cassette is substantially sealed so that the length of the magnetic tape which extends between the tape outlets of the cassette casing is protected against dust. Furthermore, the inner lid can be opened at the same time as the front lid by a lid opening member of a VTR which is designed for use with tape cassettes without inner lids. Therefore, with respect to the lid opening member of a VTR, the tape cassettes according to the present invention are compatible with existing VTRs or magnetic recording and reproducing apparatus designed for use with conventional type tape cassettes.

Since the tape outlets of the cassette casing are relatively wide, a wide region for withdrawing the magnetic tape can be defined in each of the opposite sides of the cassette casing, so as to enable a large degree of freedom of flexibility in the design of the tape path for the magnetic tape withdrawn from the cassette casing.

Although preferred embodiments of the present invention have been shown and described in detail herein, it should be understood that this invention is not limited to those specifically described embodiments and that many changes and modifications may be made therein by one skilled in the art without departing from the spirit and scope of the invention as defined by the appended claims.

I claim as my invention:

1. A tape cassette for use in a recording and/or reproducing apparatus having a lid opening member, said tape cassette comprising:

a cassette casing including a front wall having a pair of tape outlets in opposite side portions thereof, a mouth area defined between said tape outlets and a recessing one of said tape outlets for receiving the lid opening member;

a pair of tape reels rotatably disposed in said cassette casing;

a magnetic tape wound around said tape reels with a run of the magnetic tape between said reels being led out of said casing through said tape outlets and extending across said mouth area;

a front lid pivotally mounted on said cassette casing;

an inner lid pivotally mounted within said front lid;

said front and inner lids being angularly movable between closed positions in which said front lid covers a front surface of said run of the tape had said tape outlets and said inner lid covers a rear surface of said run of the tape extending across said mouth area, and opened positions in which said front and inner lids are raised relative to said cassette casing and angularly displaced relative to each other for exposing said run of the tape and uncovering said tape outlets;

said front and inner lids being movable to said open positions in response to said lid opening member extending upwardly through said recess and acting against said front lid when said tape cassette is moved to a tape loading position in said recording and/or reproducing apparatus;

said front lid having a tongue extending therefrom for closing said recess when said lids are in said closed positions thereof, said tongue being engageable by the lid opening member in a final increment of the angular movement of said front lid to its opened position so that said front and inner lids then fully expose said tape outlets and said mouth area.

2. A tape cassette according to claim 1, wherein said front lid has at least one reinforcing rib attached to said tongue.

3. A tape cassette according to claim 1, wherein said front lid has a front wall and an upper wall joined together, and wherein said tongue extends from said upper wall in a direction parallel to said front wall and has a lower edge portion for closing said recess.

4. A tape cassette according to claim 1, wherein said cassette casing has a shape which is substantially the same as the shape of a VHS-format tape cassette.

5. A tape cassette according to claim 1, further comprising a tape guide for guiding the magnetic tape to extend across said mouth area, said tape guide being positioned relative close to said mouth area in said one of said tape outlets which contains said recess, said tap guide being substantially aligned with the one of said tape reels which is positioned closest to said tape guide when said cassette casing is viewed inwardly from said front wall.

* * * * *